March 14, 1944. B. RYBKA 2,344,112
GYROSCOPIC DEVICE
Filed April 10, 1940
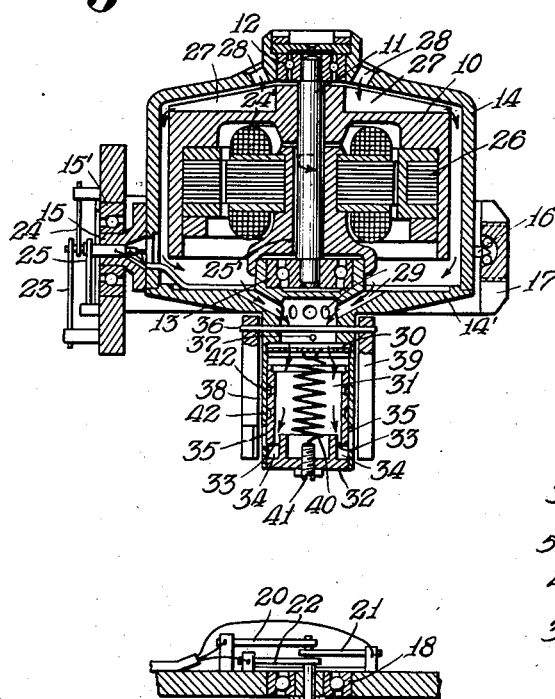
Inventor:
B. Rybka,
by Herbert H. Thompson
his Attorney.

Patented Mar. 14, 1944

2,344,112

UNITED STATES PATENT OFFICE 2,344,112

GYROSCOPIC DEVICE

Benno Rybka, Berlin-Lankwitz, Germany; vested in the Alien Property Custodian

Application April 10, 1940, Serial No. 328,935
In Germany November 25, 1938

4 Claims. (Cl. 74—5)

This invention relates to gyroscopic devices adapted for use in aircraft, the rotor of which is electrically driven and which generates compressed air, which, for example, may be used for keeping the spin axis of a horizon gyro vertical.

For vertical gyros with air-driven rotors, it is known to use pairs of pendulums suspended on the rotor housing and swinging in front of control jets, whereby the air stream serving for the erection of the gyro may be alternately opened and closed. The use of such a pneumatic control device is difficult with gyros having electric drive for the rotor, because the stream of control air generated by the rotor depends in its action upon the amount of air furnished, and this again depends upon the altitude at which the craft is flying.

According to the present invention, a regulating device is provided for the control air, which serves the purpose of keeping the control effect constant at different altitudes. For this purpose the product of air jet pressure and useful air jet cross section is kept constant.

The use of the invention in connection with a gyro-vertical will be further described by means of the drawing. However, the invention if suitably modified, may also be used with azimuth gyros, which in known manner are made to follow the position of a magnetic system by means of a pneumatic control device.

Fig. 1 is a longitudinal section of the gyro-vertical.

Fig. 2 is a horizontal section of the device through the gimbal ring and the gyro rotor housing in the plane of the gimbal bearings, showing the gyro rotor.

Fig. 3 is a sectional view, on a larger scale, through the lower portion of the gyro-vertical, the section being taken at right angles to the section of Fig. 1.

The gyro rotor 10 is supported in bearings 12 and 13 for spinning about a vertical axis 11. These bearings are mounted in the housing 14 surrounding the rotor. This housing may oscillate around the horizontal axis on trunnions 15 and 16, journalled in the gimbal frame 17, which in turn is carried by fixed bearings 18 and 19.

Three-phase alternating current is used to drive the gyro rotor, the current being conducted to the stator winding 24' by means of springs 20, 21, 22 and 23, 24, 25, respectively, and through the gimbal bearings 18 and 15'. The stator 24' is carried by the member 25' mounted in the lower part 14' of the gyro rotor housing. The rotor 10, which surrounds the stator, has a short-circuited winding 26 in which eddy currents are induced by the rotating field of the winding 24', whereby the rotor is revolved.

On top of the rotor is mounted an impeller or blower-like member 27, with fins, which receives air through a number of openings 28 through which the air may be sucked into the housing. The air flows in the direction shown by the small arrows, around the gyro rotor into the lower part of the housing and from there through passages 29 and the holes in a disc 30, into a projection 31 attached to the gyro rotor housing.

In this housing projection, a slidable member or piston 32 is movable in an axial direction. The air flows through the restricted passages 33 from the piston into a ring-shaped space 34, whence it emerges into the atmosphere through the control ports 35, 35'. In known manner, four control ports have been provided, two of which are shown at 35 in Fig. 1 and two of which are shown at 35' in Fig. 3. The two opposing ports 35 are alternately covered by pendulum valves 38 and 39, which are fastened to a shaft 36. The other two pendulums 50 and 51 are supported on an axis 37, perpendicular to the axis 36, so that the pendulums swing in a plane parallel to the paper in Fig. 1. If the gyro rotor axis deviates from the true vertical, the four air jets will be influenced to different amounts so that a reaction torque is generated which precesses the gyro directly back into the vertical, as well known in the art.

According to the present invention, the air jets are all controlled by the piston 32. A spring 40, which is fastened on one end to the fixed disc 30 and on the other end to a screw 41, which may be adjusted with respect to the piston, tries to move the piston upwardly, and thereby to open the ports 35 entirely. This effort on the part of spring 40 is counteracted by the differential air pressure acting against the piston, the magnitude of the differential pressure being the difference between the pressure of the atmosphere which surrounds the gyroscope and the air pressure within the projection 31. The greater the density of the air surrounding the instrument, the greater is the mass of air moved by the blower-like member 27, in this instance and the higher, therefore, the pressure acting internally upon the piston. The spring 40 is so designed that the effective opening or cross section of the control ports is enlarged in proportion to the decrease in pressure within the projection 31. The differential pressure within the projection 31 generated by the blower, impeller or air turbine may be shown by the relation $P = u^2/2g \cdot c$ in which P is the pressure, $u$ is the circumferential speed of the air turbine, $g$ is a constant of gravity and $c$ is the specific weight of the air. Since $u$ and $g$ may be considered constant, it will be apparent that the air pressure within the projection 31 merely varies with the specific weight of the air which is dependent on the altitude of the craft on which the instrument is employed. Inasmuch as the above relations are correct for any type of air turbine, it is not considered necessary to limit the invention to a specific form of turbine.

Obviously the reaction force acting upon the gyro is equal to the product of the differential pressure times the effective cross section of the control ports 35, 35'. This statement is substantiated by the derived relation $R=2F \cdot P$ where $R$ is the reaction force from each port, $F$ is the useful area of one of the ports from which the jets issue and $P$ is the pressure within the projection 31, the same being obtained in the following way. First, $R = Q \cdot c/g \cdot V$ in which $Q$ denotes the volume of air passing through the cross-section $F$ per sec. and $V$ is the air speed, the other factors being the same as hereinbefore noted. Another way of representing this relation is $R = F \cdot c/g \cdot V^2$. Next, substitution in this equation for the factor $V^2$ expressed in Bernoulli's equation $V^2/2g = P/C$ provides the desired relation $R = 2F \cdot P$.

In order to obtain the least amount of friction in the motion of the piston, the same is provided with ring-shaped notches 42. In lieu thereof, a suitably formed lining provided with the notches may be fitted into the housing projection 31. In this case, the piston may be kept smooth without notches and may be produced with extremely thin walls, which is of great advantage with respect to weight. It is necessary that the weight of the piston be negligible as compared with the weight of the gyro, so that small changes of position of the piston do not appreciably change the position of the center of gravity.

Instead of varying the effective cross section of the control ports in accordance with the change of pressure of the air provided by the blower, the arrangement may be such that with constant cross section, the jet pressure of the control air is kept constant. The simplest way of doing this is by leading the control air through a throttling valve, the cross section of which is controlled by means of a pressure regulator controlled by the jet pressure and the atmospheric pressure.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A gyroscopic device for aircraft having a rotor casing, a constant speed electrically driven rotor therein, an air impeller in said casing driven by the rotor for supplying air under pressure by which the device is erected, the air pressure generated by the impeller being proportional to the density of the air in which the device is operating, an erection control element for the gyroscopic device comprising gravitationally governed ports in said casing through which the air supplied by the impeller is differentially discharged, and means responsive to changes in the generated air pressure of the air impeller at different altitudes of the aircraft for varying the effective area of the ports through which the air issues and by the variation of the port areas maintaining the erection forces exerted on the gyroscopic device substantially constant within determined limits of altitude of the aircraft, said means comprising a projecting portion attached to the rotor casing, said projecting portion being hollow and having said ports provided therein, a member slidable in said projecting portion for opening and closing said ports and resilient means connected to said member for controlling its movement, said casing being provided with conduits communicating with said hollow projecting portion whereby air generated by said impeller is introduced into said projecting portion and against the member.

2. A gyroscopic device for aircraft having a rotor casing, a rotor therein and rotor spinning means, an air impeller in said casing for generating air pressure proportional to the density of the air in which the device is operating and thereby supplying the air pressure by which the device is erected, an erection control element for the gyroscopic device comprising pendulum governed ports through which the air supplied by the impeller is differentially discharged, and means for varying the effective area of the ports through which the air issues so that the variation of the port areas combined with the supplied air pressure maintains the erection forces exerted on the gyroscopic device substantially constant within determined limits of altitude of the aircraft, said means comprising a projecting portion attached to said casing, said projecting portion being hollow and having said ports extending through the wall thereof at a location near the end of the projecting portion most distant from the casing, said casing being provided with conduits communicating with said projecting portion whereby air under pressure generated by said impeller is introduced into said projecting portion, a pendulum for each port, each pendulum pivotally mounted on said projecting portion and extending along the exterior surface of the projecting portion, a member slidable in said projecting portion for opening and closing said ports and resilient means suspended from one end within said projecting portion and fixed at its other end to said member for controlling the movement of the member.

3. A gyroscopic device for aircraft having a rotor casing, a rotor therein and rotor spinning means, an air impeller in said casing for generating air pressure proportional to the density of the air in which the device is operating and thereby supplying the air pressure by which the device is erected, an erection control element for the gyroscopic device comprising pendulum governed ports through which the air supplied by the impeller is differentially discharged, and means for varying the effective area of the ports through which the air issues so that variation of the port areas combined with the supplied air pressure maintains the erection forces exerted on the gyroscopic device substantially constant within determined limits of altitude of the aircraft, said means comprising a projecting portion attached to said casing, said projecting portion being hollow and having said ports extending therethrough, said casing being provided with conduits which communicate with said projecting portion and allow air under pressure generated by said impeller to be introduced into said projecting portion, a disc fixed within said projecting portion near the end of the projecting portion adjacent said casing, said disc being provided with openings therethrough for the passage of air delivered by said impeller, a member slidable in said projecting portion for opening and closing said ports and spring means connected to said member and to said disc whereby to control the movement of said member.

4. A gyroscopic device for aircraft as set forth in claim 3 wherein said slidable member is hollow and is provided with peripheral ports which are moved into communication with the ports in said projecting portion in accordance with the position of said member.

BENNO RYBKA.